United States Patent [19]

Kaneko

[11] Patent Number: 5,442,557
[45] Date of Patent: Aug. 15, 1995

[54] NAVIGATION DEVICE

[75] Inventor: Michihiro Kaneko, Kawagoe, Japan

[73] Assignee: Pioneer Electronic Corporation, Tokyo, Japan

[21] Appl. No.: 917,165

[22] Filed: Jul. 20, 1992

[30] Foreign Application Priority Data

Jul. 26, 1991 [JP] Japan .................................. 3-187453
Jul. 26, 1991 [JP] Japan .................................. 3-187454

[51] Int. Cl.⁶ ............................................ G06F 165/00
[52] U.S. Cl. .................................... 364/449; 364/444; 340/990; 340/995
[58] Field of Search ........................ 364/443, 444, 449; 73/178 R; 340/988, 990, 995; 342/357

[56] References Cited

U.S. PATENT DOCUMENTS

| | | | |
|---|---|---|---|
| 5,031,104 | 7/1991 | Ikeda et al. | 364/449 |
| 5,059,965 | 10/1991 | Geiser | 340/995 |
| 5,067,082 | 11/1991 | Nimura et al. | 340/988 |
| 5,087,919 | 2/1992 | Odagawa et al. | 342/357 |
| 5,121,326 | 6/1992 | Moroto et al. | 340/995 |
| 5,191,532 | 3/1993 | Moroto et al. | 340/990 |
| 5,231,584 | 7/1993 | Nimura et al. | 340/990 |

FOREIGN PATENT DOCUMENTS 4118606 12/1991 Germany .

OTHER PUBLICATIONS

VNIS '89 Conference Record, 11–13 Sep. 1989, Toronto Canada, D. L. Frank "Information Systems: An Integral Part of Future Vehicles".

Primary Examiner—Gary Chin
Attorney, Agent, or Firm—Kane, Dalsimer, Sullivan, Kurucz, Levy, Eisele and Richard

[57] ABSTRACT

In a navigation device, a position measurement unit measures a current position of a movable body and generates current position information indicating the current position of the movable body. A map information storing unit stores map information. An additional information storing unit stores additional information which can be indicated together with the map information. The additional information is information useful to navigation. A control unit generates indication information including the current position of the movable body, the map information concerning the current position of the movable body, and the additional information concerning the map information related to the current position of the movable body. An indicating unit externally indicates the indication information.

7 Claims, 15 Drawing Sheets

FIG.5A

| $Z_{11}$ | $Z_{12}$ | $Z_{13}$ | $Z_{14}$ | $Z_{15}$ |
| --- | --- | --- | --- | --- |
| $Z_{26}$ | $Z_1$ | $Z_2$ | $Z_3$ | $Z_{16}$ |
| $Z_{25}$ | $Z_8$ | $Z_0$ | $Z_4$ | $Z_{17}$ |
| $Z_{24}$ | $Z_7$ | $Z_6$ | $Z_5$ | $Z_{18}$ |
| $Z_{23}$ | $Z_{22}$ | $Z_{21}$ | $Z_{20}$ | $Z_{19}$ |

FIG.5B $Z_a$, $Z_1$, $Z_0$, $Z_4$, $Z_b$

NAVIGATION DEVICE

BACKGROUND OF THE INVENTION

1. Field of the Invention

The present invention generally relates to a navigation device, and more particularly to a navigation device having an improved information indicating function for navigation.

2. Description of the Related Art

There is a self-sustaining navigation device, which is a position measuring device for use in movable bodies, such as automobiles, airplanes and ships. Such a self-sustaining navigation device obtains a two-dimensional displacement (vector quantity) of a movable body by using azimuth data from an azimuth sensor and speed data from a speed sensor, and adds the two-dimensional displacement to a reference point. In this manner, the current position of the movable body can be identified. For example, the navigation device installed in an automobile operates as follows.

Namely, a predetermined number of pulses are generated while one turn of a drive shaft is completed. The distance between a reference point and the current position is calculated by obtaining the total number of pulses generated during the time the automobile moves the distance. The distance is multiplied by a distance correction coefficient in order to obtain a traveling distance.

A GPS (Global Positioning System) type navigation device is a position measuring device using a satellite. The GPS type navigation device receives electric waves emitted from three or more than GPS satellites, and measures the position of a receiving point by referring to pseudo-distance data including a time offset of a receiver based on the distance between each GPS satellite and the receiving point, and position data indicating each GPS satellite. The position of the receiving point is indicated on a display.

The navigation device is provided with, for example, a current position operation unit, an information processing unit, and a display unit.

The operation of this kind of navigation device is as following. Namely, the current position operation unit generates data indicating the current position of an automobile in which the navigation device is installed. The information processing unit reads, map data concerning an area in which the obtained current position is located. Then, the information processing unit generates graphic data from the map data and the data indicating the current position outputted by the current position operation unit. The display unit receives the graphic data from the information processing unit and displays the map and the current position. In this manner, the driver or passenger of the automobile understands the current position on the map displayed on the display unit.

However, the above explained type of navigation device has the following disadvantage. The picture plane of the display unit has a limited size, and it is required that pieces of information (characters, map symbols and the like) displayed thereon have sizes visible to the naked eye. Hence, there is a limit regarding the area displayable on the picture plane. In particular, when a part of the area on the picture plane is enlarged, it is difficult to understand the current position from the information concerning only the enlarged area displayed on the display unit.

The above-mentioned navigation device has another disadvantage described below. A diverging direction sign (traffic information sign) showing areas in the diverging directions is provided immediately before an intersection. However, if the driver or passenger misses seeing the diverging direction sign, the driver cannot obtain information indicated by the diverging direction sign from the navigation device.

SUMMARY OF THE INVENTION

It is an object of the present invention is to provide a navigation device capable of providing the user with additional information useful to navigation and different from map information.

The above object of the present invention is achieved by a navigation device having the following structural elements. A position measurement unit measures a current position of a movable body and generates current position information indicating the current position of the movable body. A map information storing unit stores map information. An additional information storing unit stores additional information which can be indicated together with the map information. The additional information is information useful to navigation. A control unit generates indication information including the current position of the movable body, the map information concerning the current position of the movable body, and the additional information concerning the map information related to the current position of the movable body. An indicating unit externally indicates the indication information. The additional information may be information concerning conspicuous objects, such as railroad stations, building, or interchanges. The additional information may be information concerning a diverging direction sign located in the vicinity of an intersection.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIGS. 5A and 5B are diagrams showing the operation of the navigation device according to the first embodiment of the present invention;

DESCRIPTION OF THE PREFERRED EMBODIMENTS

Figure 1:
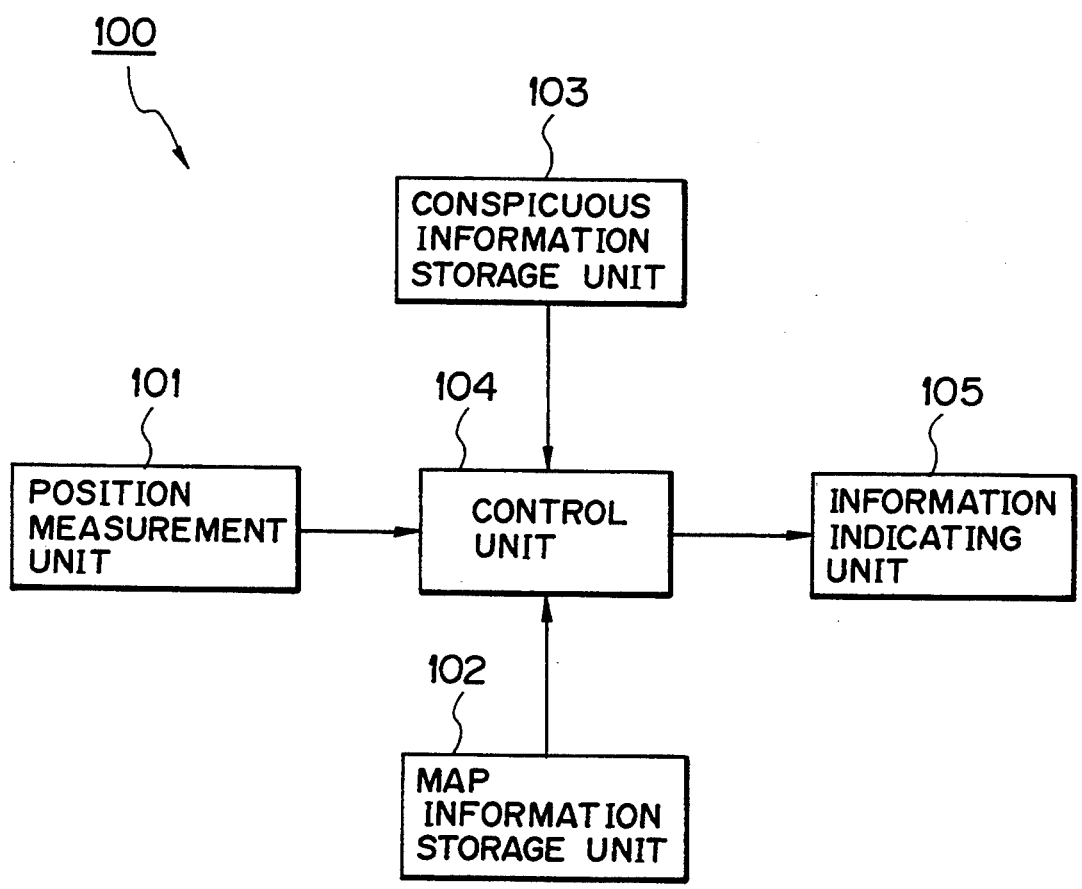
FIG. 1 is a block diagram-showing an overview of a navigation device according to a first embodiment of the present invention.

FIG. 1 shows an overview of a navigation device 100 according to a first embodiment of the present invention. The navigation device 100 comprises a position measurement unit 101, a map information storage unit 102, a conspicuous object information storage unit 103, a control unit 104 and an information indicating unit 105. The position measurement unit 101 measures the current position of a movable body, such an automobile, and generates current position information indicating the current position of the automobile. The map information storage unit 102 stores map information. The conspicuous object information storage unit 103 stores conspicuous object information concerning conspicuous objects, such as specific facilities in the map information. The control unit 104 reads, from the map information storage unit 102, map information (current map information) containing the current position indicated by the current position information generated by the position measurement unit 101, and makes the information indicating unit 105 indicate the map on which the current position information is superimposed. Further, the control unit 104 reads, from the conspicuous object information storage unit 103, conspicuous object information of specific facilities which are located close to the current position and which are not included in the current map information, and controls the information indicating unit 105 so that the signs of the specific facilities are indicated together with the map. Hence, the user can easily understand his or her current position from the map indicated by means of the information indicating unit 105.

Figure 2:
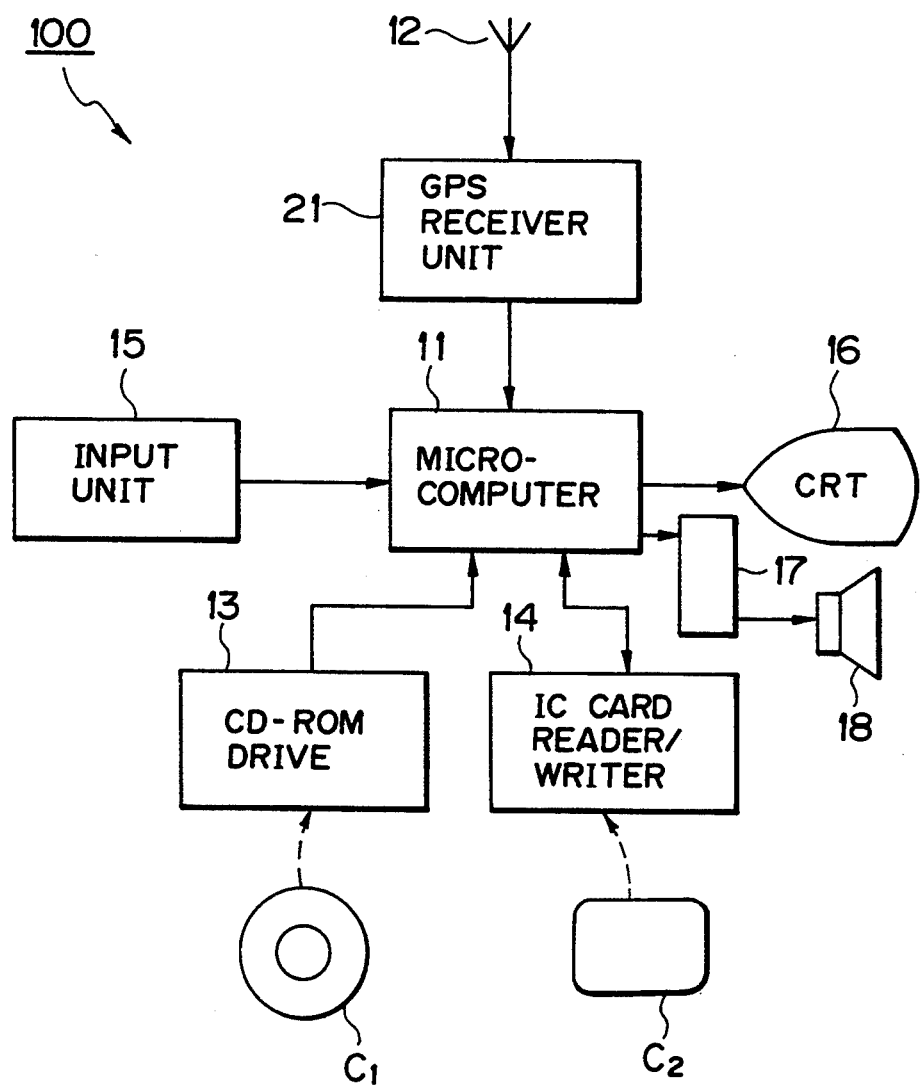
FIG. 2 is a block diagram of a hardware structure of the navigation device shown in FIG. 1.

FIG. 2 shows a hardware structure of the navigation device 100 shown in FIG. 1. The navigation device 100 shown in FIG. 2 comprises an antenna 12 communicating with a satellite (not shown), a GPS receiver unit 21, a microcomputer 11, an input unit 15, a CRT unit 16, a CD-ROM driver 13, an IC card reader/writer 14, a speech synthesizing device 17 and a speaker 18. The CD-ROM drive 13, the IC card reader/writer 14, the input unit 15, the CRT unit 16, the speech synthesizing device 17 and the GPS receiver unit 21 are connected to the microcomputer 11. The CD-ROM drive 13 reads data from a CD-ROM disc C1. The IC card reader/writer 14 reads data from an IC card C2 and writes data into the IC card C2. It is possible to omit the speech synthesizing device 17 and the speaker 18.

Figure 3:
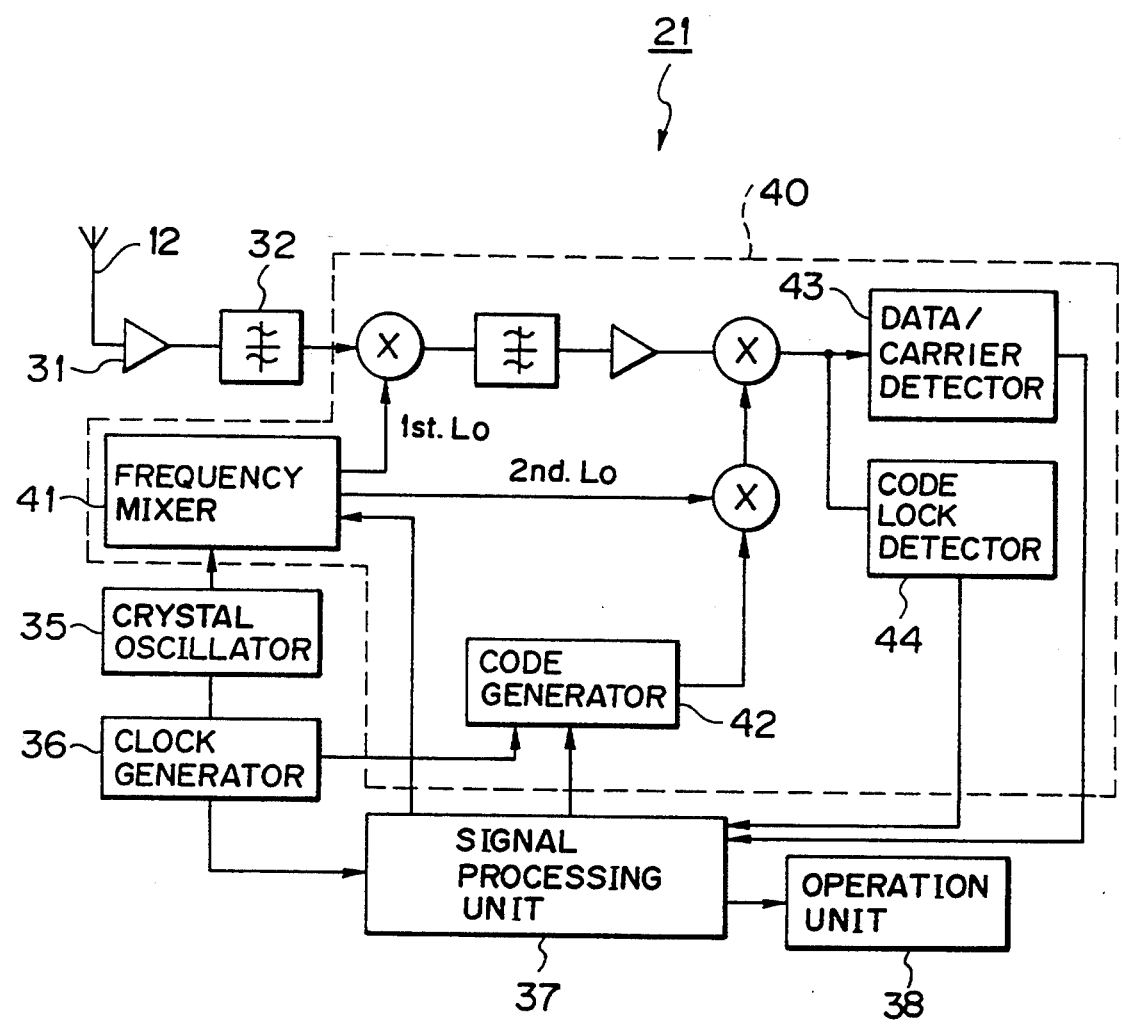
FIG. 3 is a block diagram of a GPS receiver unit shown in FIG. 2.

FIG. 3 shows the GPS receiver unit 21, which is configured as follows. The GPS antenna 12 is coupled to the GPS receiver unit 21 via a preamplifier 31 and a band-pass filter 32. A crystal oscillator 35 generates a reference frequency signal, which is a reference timing control signal of the GPS receiving unit 11. A clock generator 36 generates, from the reference frequency signal, a clock signal for controlling operation timing of a signal processing unit 37. An operation unit 38 is connected to the signal processing unit 37.

Further, the GPS receiver unit 21 comprises a GPS receiver 40 having the following components. A frequency mixing circuit 41 generates a signal having the same pattern as data relating to a carrier of the GPS satellite, the position thereof, and a clock built in the GPS satellite. A code generator 42 receives the clock signal generated by the clock generator 36, and generates a code signal having the same pattern as a distance measurement signal. A data/carrier detector 43 synchronously detects, by using the output signals of the frequency mixing circuit 41 and the code generator 42, data relating to the clock built in the GPS satellite and an orbit of the GPS satellite, and the carrier. A code lock detector 44 synchronously detects the above-mentioned distance measurement signal by using the code signal generated by the code generator 42.

The operation unit 38 includes a self-sustaining type position measurement unit (not shown). An azimuth sensor used for forming the self-sustaining type position measurement unit is formed with, for example, a conventional attitude sensor or a conventional gyrocompass, and detects a direction in which the receiving point moves. A speed sensor used for detecting the movement speed of the receiving point is formed with, for example, a conventional speed sensor. The movement distance of the receiving point is calculated by a pulse signal output of the speed sensor and a distance correction coefficient. The movement distance is integrated in accordance with changes in the movement direction of the receiving point detected by the azimuth sensor. Hence, a route of the movement of the movable body from the reference point is calculated, and the current position can be identified.

The antenna 12 and the GPS receiver unit 21 form the position measurement unit 101 shown in FIG. 1, and the CD-ROM drive 13 and the CD-ROM disc C1 form the map information storage unit 102 in FIG. 1. The IC card reader/writer 14 and the IC card C2 form the conspicuous object information storage unit 103 shown in FIG. 1. The CRT device 16 in FIG. 2 corresponds to the information indicating unit 105 shown in FIG. 1, and the microcomputer 11 in FIG. 2 corresponds to the control unit 104 in FIG. 1.

Figure 4:
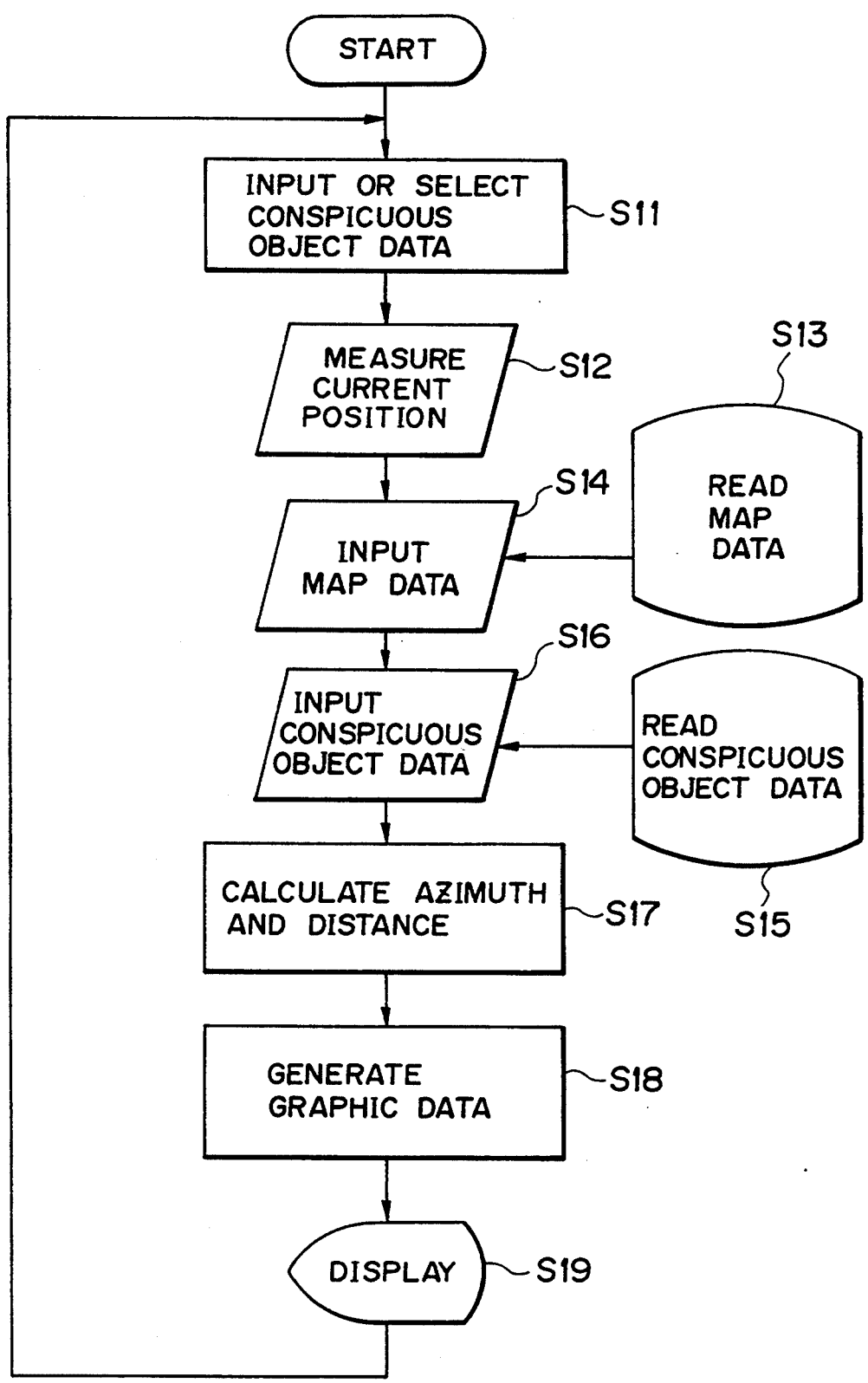
FIG. 4 is a flowchart of the operation of the navigation device according to the first embodiment of the present invention.

A description will now be given for the operation of the navigation device 100 with reference to FIG. 4. The user selects or inputs conspicuous object data by means of the input unit 15 (step S11). The conspicuous object data is data concerning the positions of traffic facilities, such as stations of railroads, traffic centers, bus terminals, or highway interchanges, famous buildings (for example, high buildings), famous parks or the like. For example, the user can select conspicuous object data concerning railroad stations in step S11. It is also possible for the user to select nothing in step S11.

In response to an instruction from the microcomputer 11, the GPS receiver unit 21 receives position data via the antenna 12, and generates the current position data showing the current position of the movable body (step S12). The current position data generated by the GPS receiver 11 is output to the microcomputer 11. In response to an instruction from the microcomputer 11, the CD-ROM drive 13 reads map data from the CD-ROM disc C1 (step S13). The map data includes data showing the lie of the land (hills, rivers, lakes or the like), a road network, a railroad network or the like. The map data read from the CD-ROM disc C1 is related to an area in which the current position indicated by the current position data is included. Hereinafter, such an area in which the current position is included is referred to as a current map area. The map data read from the CD-ROM disc C1 is received by the microcomputer 11 (step S14).

Subsequently, the IC card reader/writer 14 reads the conspicuous object data from the IC card C2 in response to an instruction from the microcomputer (step S15). The conspicuous object data specified in step S11 is read from the IC card C2 in step S15 and is related to the map formed by the map data read from the CD-ROM from the CD-ROM disc C1 but not included in the map data. If a category of "railroad station" is selected in step S11, the conspicuous object data read in step S15 is data indicative of the position of a neighboring railroad station. The term "neighboring" is defined as follows. If the current map area displayed on the CRT unit 16 is $Z_0$ shown in FIG. 5A, the "neighboring" is related to map areas $Z_1$-$Z_8$, which are not displayed when the current map area $Z_0$ is displayed. It is also possible to define the term "neighboring" with respect to the current map area so that not only the map areas $Z_1$-$Z_8$ but also map areas $Z_{11}$-$Z_{26}$ are indicated. It is also possible to define the term "neighboring" by means of the following algorithm. Referring to FIG. 5B, if railroad stations are respectively located in map areas $Z_1$, $Z_4$, $Z_a$ and $Z_b$ in the case where the map area $Z_0$ serves as the current map area, the map areas $Z_4$ and $Z_b$ are neighboring areas. The map areas $Z_1$ and $Z_a$ are located in an identical direction with respect to the current map area $Z_0$. Since the map area $Z_1$ is closer to the current map area $Z_0$ than the map area $Z_a$, the map area $Z_1$ is handled as the neighboring map area. It is also possible to employ another algorithm based on the combination of the algorithms respectively shown in FIGS. 5A and 5B. The conspicuous object data read from the IC card C2 is received by the microcomputer 11 (step S16).

The microcomputer 11 calculates, from the data received, the current position, the azimuth and distance to each neighboring conspicuous object (step S17). Then, the microcomputer 11 generates graphic data forming a display image in which the current position, the current map area, the azimuth and distance to each neighboring conspicuous object are superimposed (step S18). The picture image thus formed is displayed on the CRT device 16 (step S19).

Figure 6:
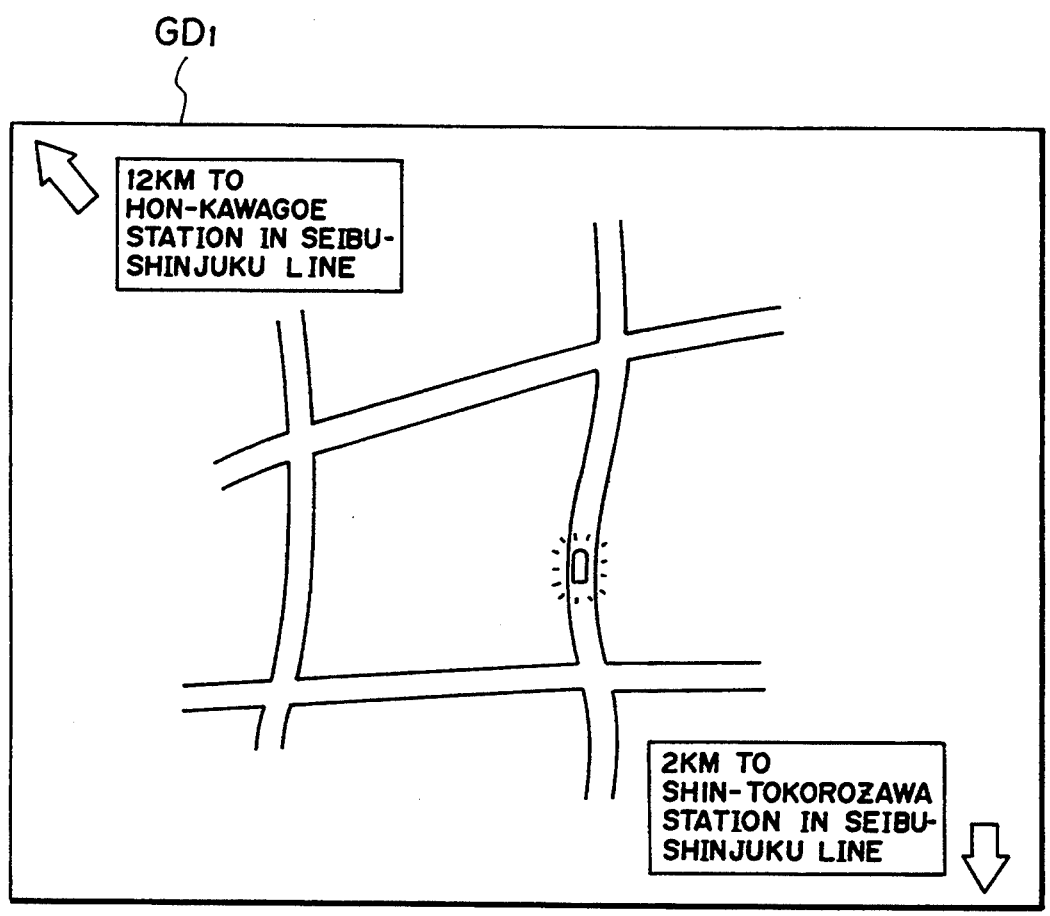
FIGS. 6, 7, 8 and 9 are respectively diagrams showing examples of display created by the first embodiment of the present invention.

FIGS. 6 through 9 respectively show examples of display images displayed on the CRT device 16. FIG. 6 shows a display image $GD_1$ obtained when a movable body highlighted is moving in an area in the vicinity of Tokogozawa, and Kawagoe, both in Saitama Prefecture, and the category of conspicuous objects specified is "railroad station". The display image $GD_1$ show the name of a railroad, the names of two neighboring stations, the azimuths from the current position to the neighboring stations (indicated by arrows), and the distances between the current position and the neighboring stations (the distance is expressed in kilometers, and obtained by counting fractions over 2/1 as one and disregarding the rest).

Figure 7:
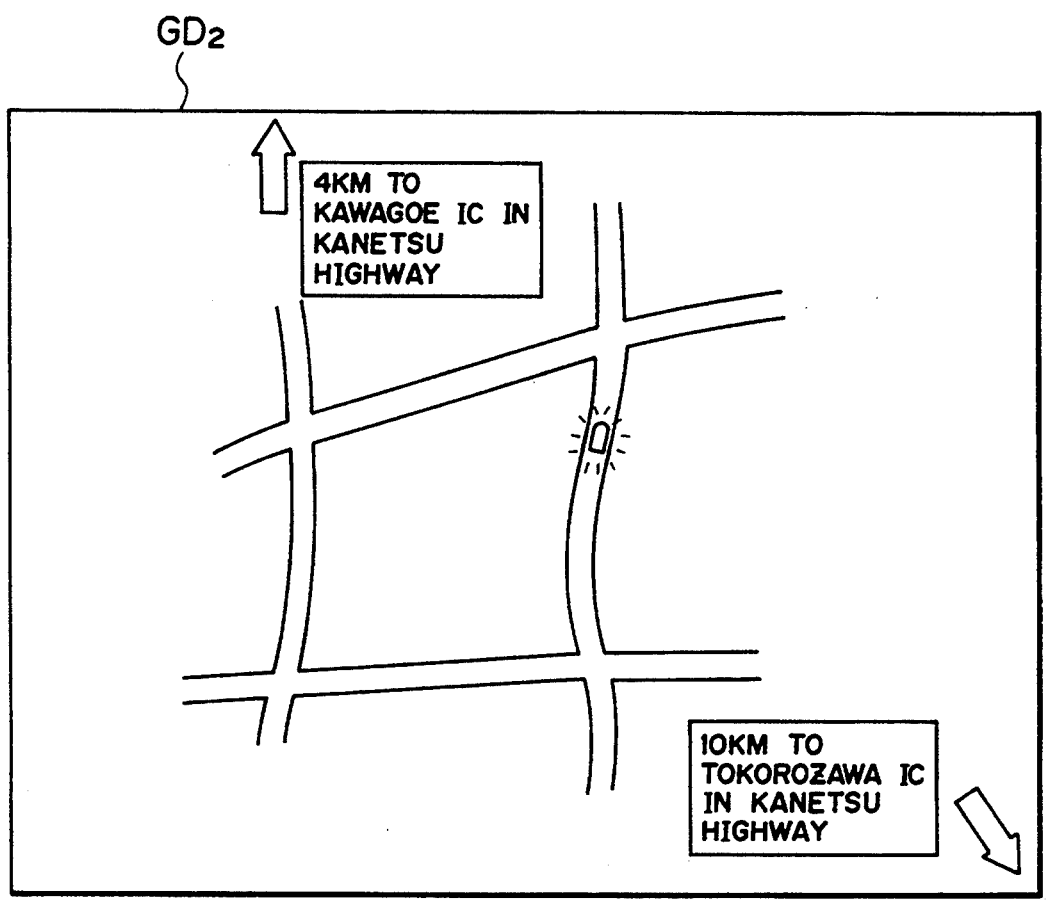
Figure 8:
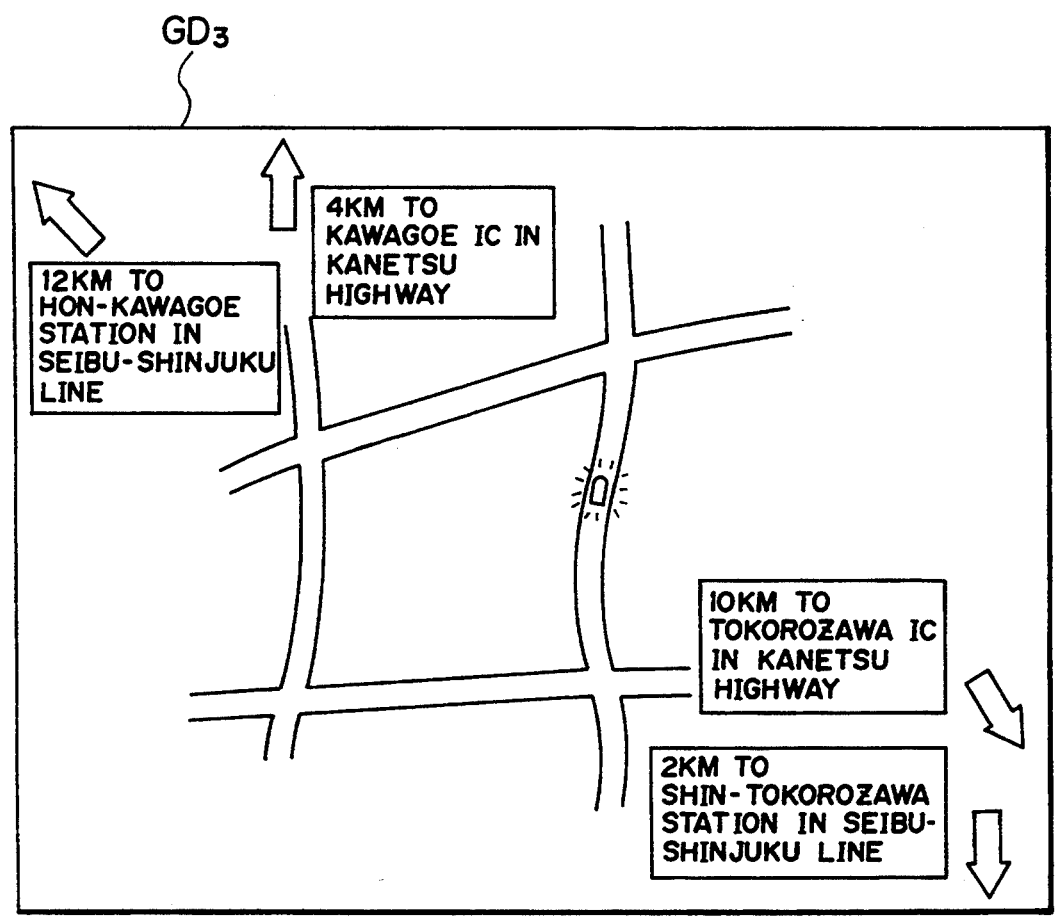

FIG. 7 shows a display image $GD_2$ obtained when a movable body highlighted is moving in the same area as above and the category of conspicuous objects specified is "interchange". FIG. 8 Shows a display image $GD_3$ on which a movable body is moving in the same area as above and the category of conspicuous object specified is "traffic facility". The conspicuous object data shown on the display image $GD_3$ includes the conspicuous object data shown on the display images $GD_1$ and $GD_2$.

Figure 9:
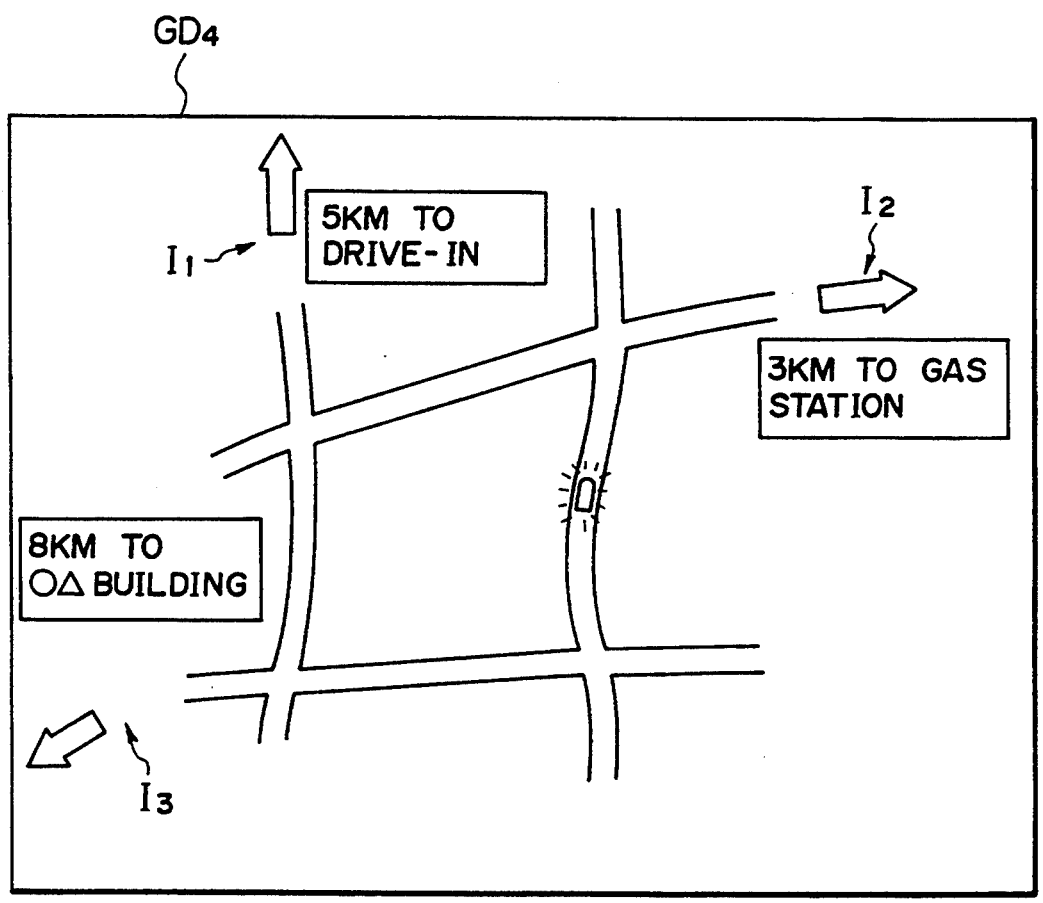

According to the first embodiment of the present invention, it is also possible to form a display image as shown in FIG. 9. Signs displayed on a display image $GD_4$ shown in FIG. 9 do not indicate conspicuous objects serving as landmarks but drivers' facilities which would be interesting or important to drivers, such as a drive-in ($I_1$) and a gas station ($I_2$). Further, a conspicuous object ($I_3$) which would not be interesting to the public at large conspicuous but is manually input by the user. This conspicuous object can be externally input by means of the input unit 15 in step S11.

A description will now be given of a second embodiment of the present invention. The second embodiment of the present invention is intended to indicate data concerning diverging directions from a specific intersection when the movable body approaches the specific intersection. Hence, even if the driver or passenger misses seeing the diverging direction slain located immediately before an intersection, he or she can obtain data concerning the diverging directions from the navigation device.

Figure 10:
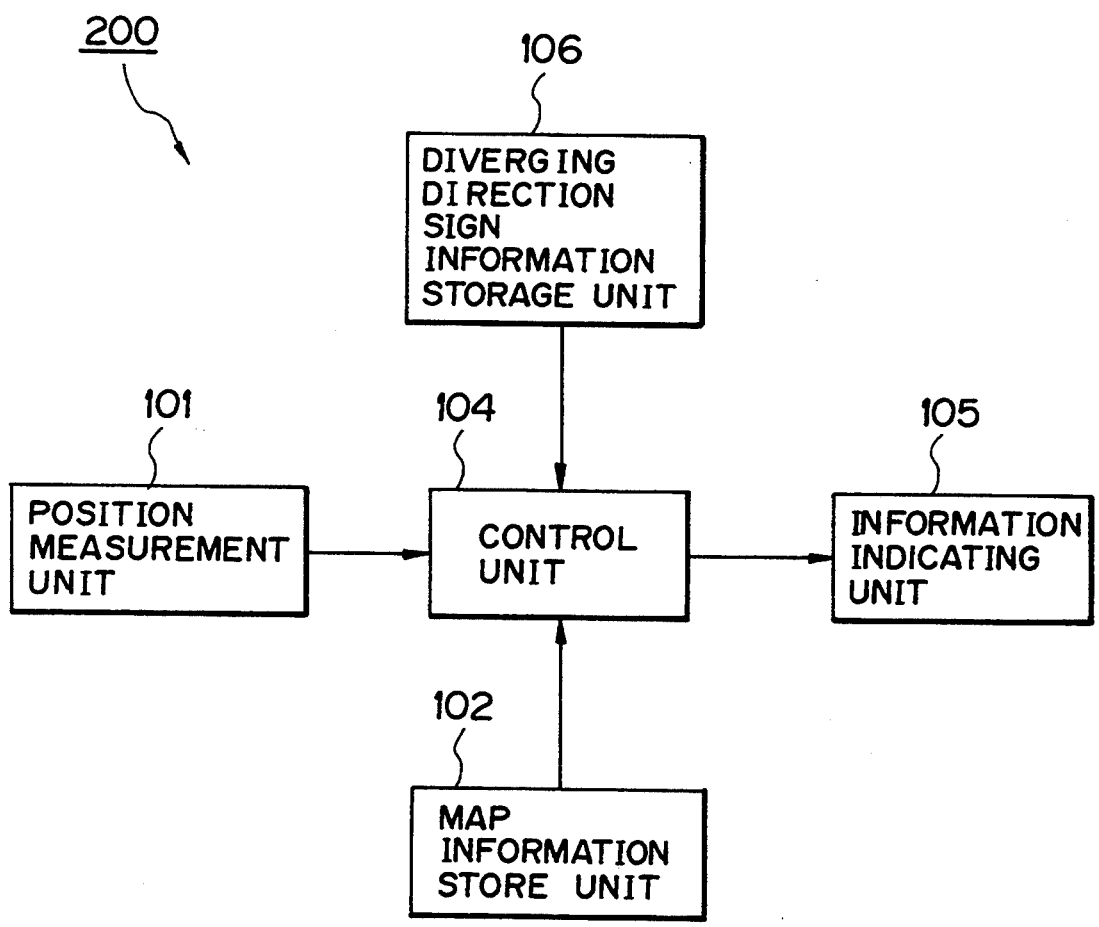
FIG. 10 is a block diagram showing an overview of a navigation device according to a second embodiment of the present invention.

FIG. 10 shows an overview of a navigation device 200 according to the second embodiment of the present invention. In FIG. 10, parts which are the same as parts shown in FIG. 1 carry the same reference numerals as previously. A diverging direction sign information storage unit 106 shown in FIG. 10 is substituted for the conspicuous object information storage unit 103 shown in FIG. 1. The diverging direction sign information storage unit 106 stores diverging direction sign information concerning districts in diverging directions from each specific intersection. The control unit 104 reads, from the map information storage unit 102, map information (current map information) containing the current position indicated by the current position information generated by the position measurement unit 101, and makes the information indicating unit 105 display the map on which the current position information is superimposed. Further, when the movable body is approaching a specific intersection in the current map area, the control unit 104 reads, from the diverging direction sign information storage unit 106, diverging direction sign information concerning the above intersection and controls the information indicating unit 105 so that the direction information is displayed together with the map.

Figure 11:
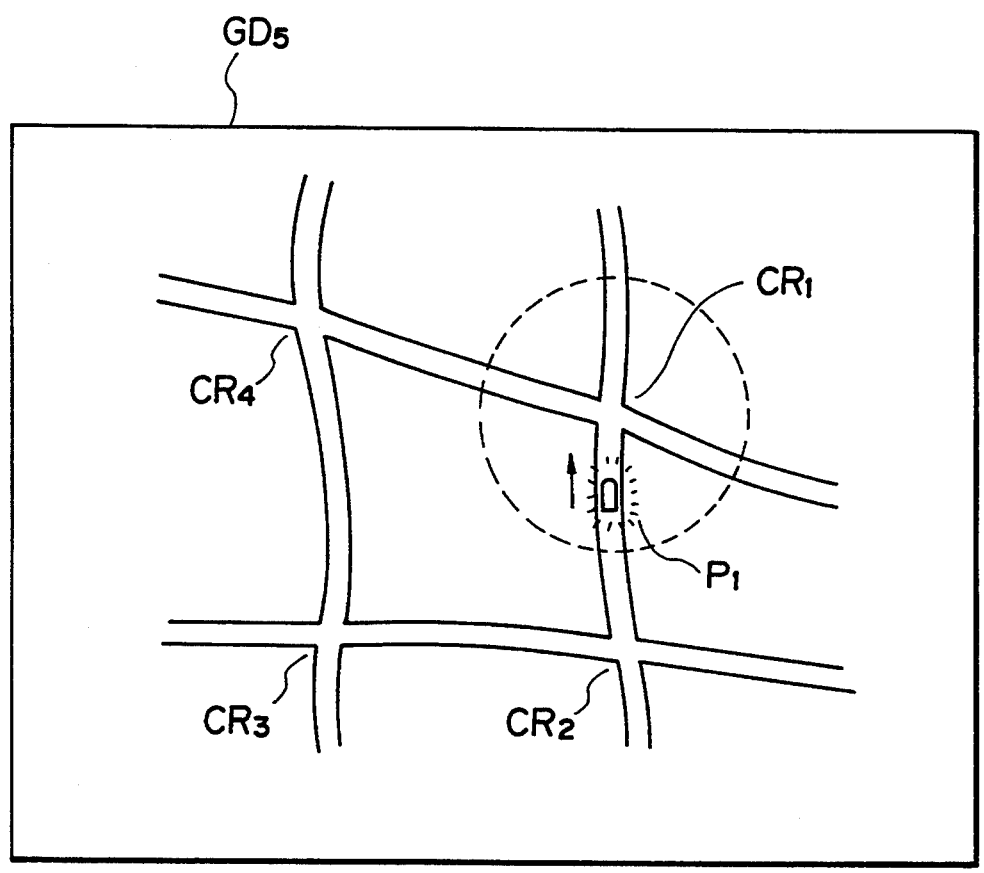
FIG. 11 is a diagram showing the operation of the second embodiment of the present invention shown in FIG. 10.

The hardware structure of the navigation device 200 shown in FIG. 10 is the same as that of the navigation device 100 shown in FIG. 2 except that the IC card C2 stores the diverging direction sign data. As shown in FIG. 11, the district sign data shown in a current map area (display image) $GD_5$ is data concerning areas in diverging directions from an intersection $CR_1$ which automobile P1 is approaching. The intersection $CR_1$ has four diverging directions. The automobile P1 is approaching the intersection $CR_1$ in one of the four diverging directions. In this case, the diverging direction sign indicates information concerning the remaining three diverging directions. The diverging direction sign data comprises the coordinates of the center of the intersection $CR_1$, pieces of vector data respectively indicating the diverging directions from the center of the intersection $CR_1$, and the names of areas (towns, cities or the like) respectively available in the diverging directions. It is also possible to arrange the diverging direction sign data so that it contains data indicating the address of an area in which the intersection $CR_1$ is located, the name of the intersection $CR_1$, the name and number of each intersecting road.

Figure 12:
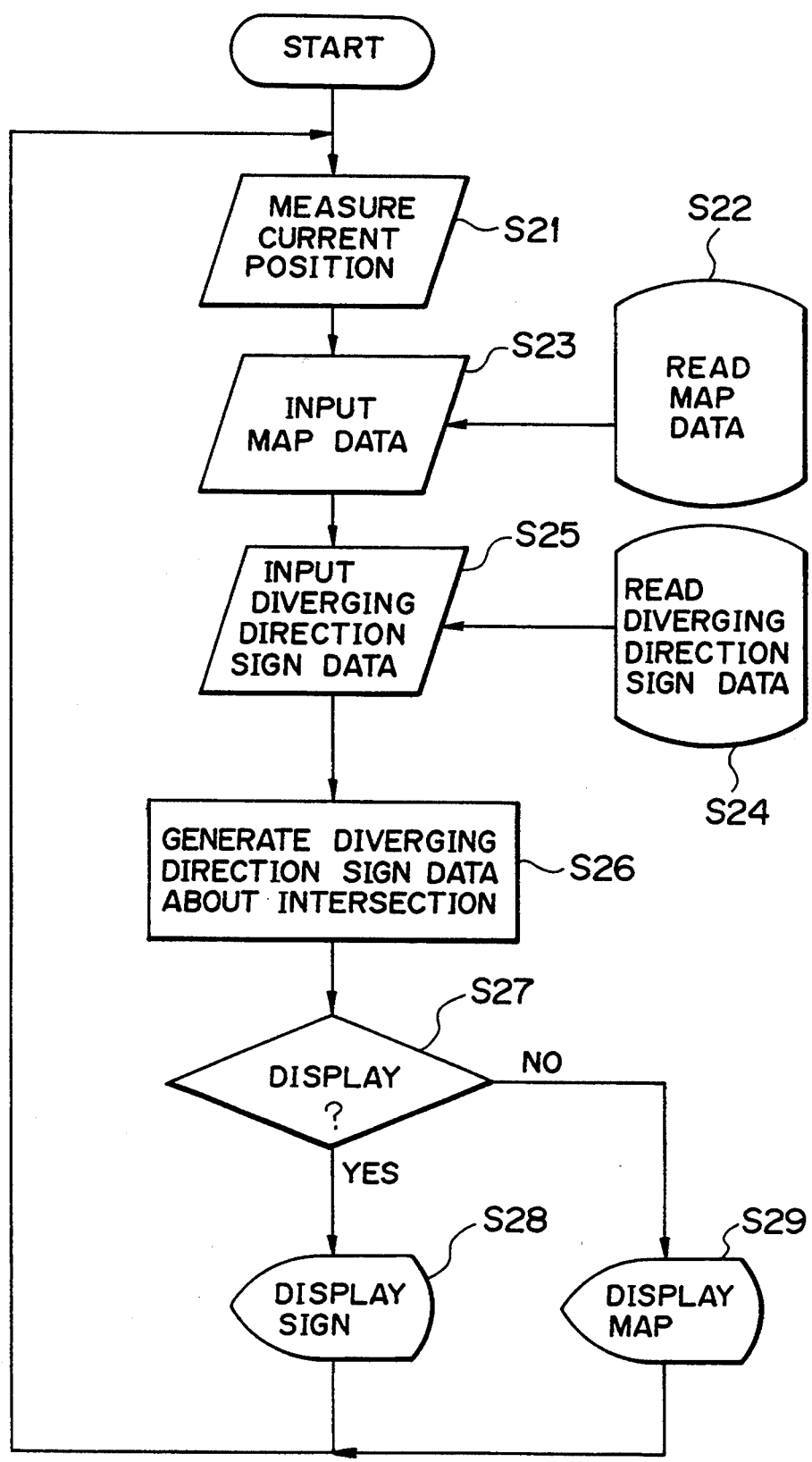
FIG. 12 is a flowchart of the operation of the second embodiment of the present invention.

A description will now be given of the operation of the second embodiment of the present invention with referring to FIG. 12. In response to an instruction from the microcomputer 11, the GPS receiver unit 21 receives position data via the antenna 12, and generates the current position data showing the current position of the movable body (step S21). The current position data generated by the GPS receiver 11 is output to the microcomputer 11. In response to an instruction from the microcomputer 11, the CD-ROM drive 13 reads map data from the CD-ROM disc C1 (step S22). The map data includes data showing the lie of the land (hills, rivers, lakes or the like), a road network, a railroad network or the like. The map data read from the CD-ROM disc C1 is related to an area in which the current position indicated by the current position data is included. The map data read from the CD-ROM disc C1 is received by the microcomputer 11 (step S23).

Subsequently, the IC card reader/writer 14 reads the diverging direction sign data from the IC card C2 in response to an instruction from the microcomputer (step S24) and outputs it to the microcomputer 11. The microcomputer 11 inputs the diverging direction sign data transferred from the IC card reader/writer 14 (step 25).

Then, the microcomputer 11 generates graphic data for displaying data concerning the respective diverging directions by using the diverging direction sign data read from the IC card C2 (step S26). Referring to FIG. 11, if the user inputs a request for display of the diverging direction sign data by means of the input unit 15 when the position mark P1 of the movable body is located in an area (depicted by a broken line) around the intersection $CR_1$ (step S27) which the movable body $P_1$ is approaching, the graphic data generated in step S26 is output to the CRT unit 16 on which the diverging direction sign data is displayed (step S28). If the user does not input the above request in step S27, the CRT unit 16 continues to display the display image $GD_1$ shown in FIG. 11 (step S29).

Figure 13:
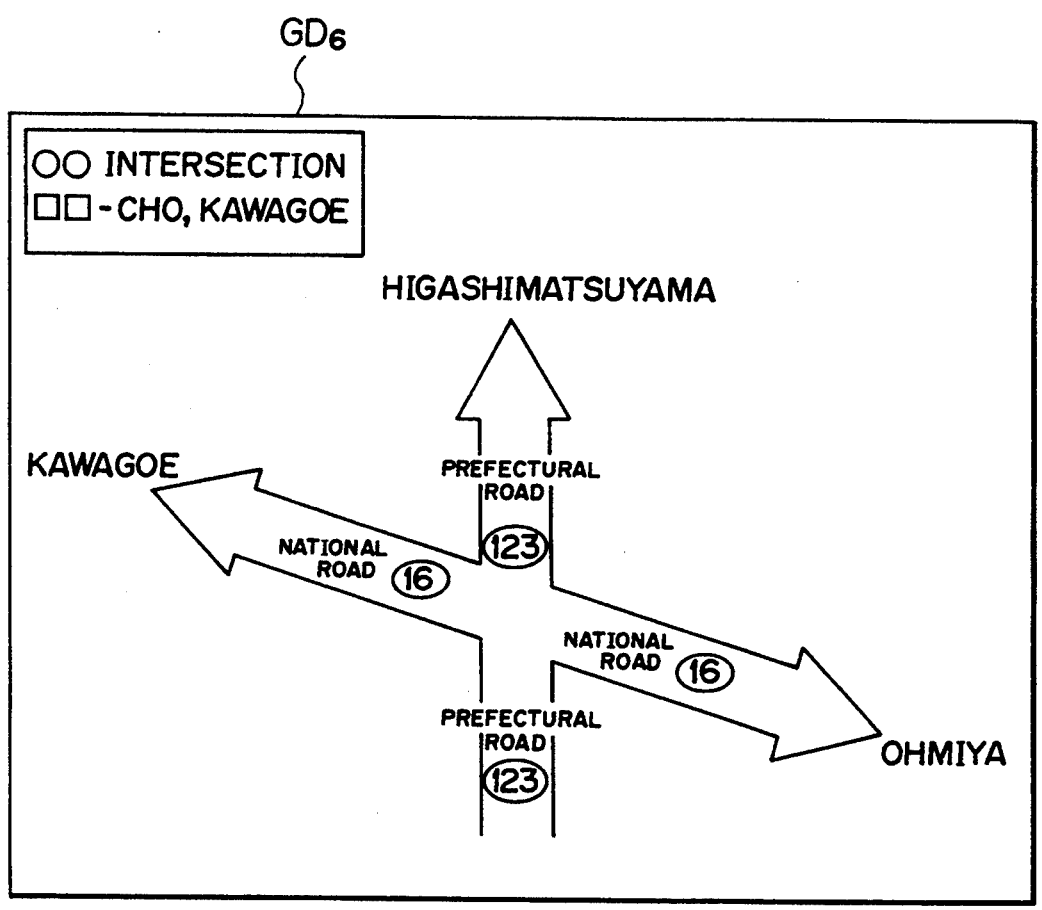
FIG. 13, 14 and 15 are respectively diagrams showing examples of display created by the second embodiment of the present invention.

FIG. 13 shows diverging direction signs displayed on the CRT unit 16, and shows an intersection in an area in the vicinity of Kawagoe, Saitama Prefecture. As shown in FIG. 13, the display unit 16 displays data concerning the diverging directions (indicated by respective arrows), respective destination areas, the categories of the intersecting roads (for example, national roads or prefectural roads), the name and number of each of the roads, the name of the intersection, and the address of the area. The above data will be useful to the user in order to determine which one of the roads should be selected.

Figure 14:
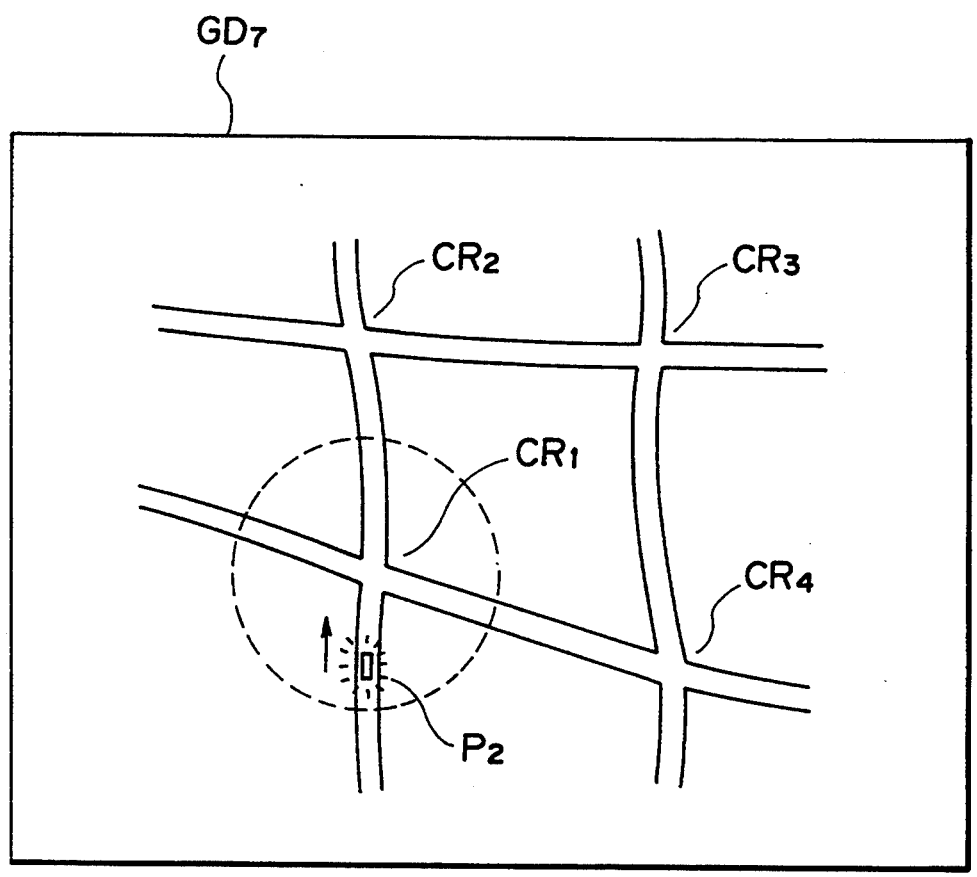
Figure 15:
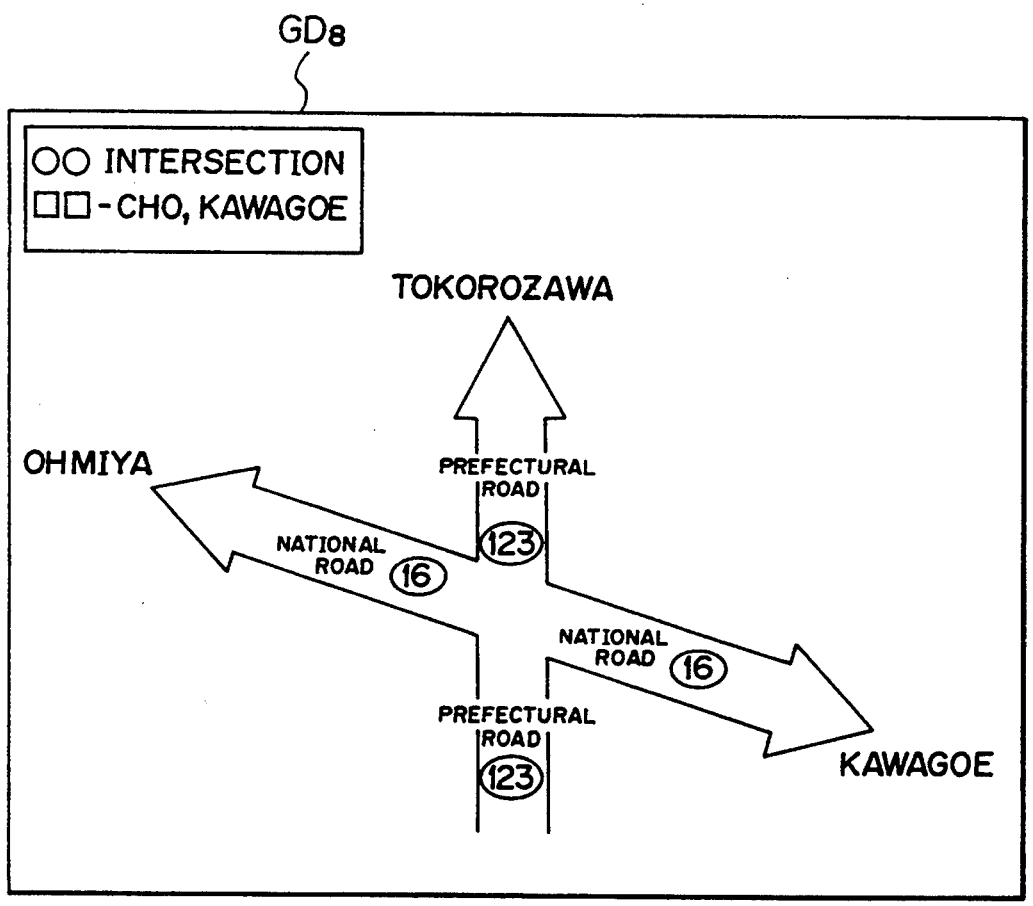

It is also possible to display the diverging direction sign in a manner shown in FIG. 14 or FIG. 15. In the case shown in FIG. 11, if the movable body $P_1$ passes over the intersection $CR_1$ and returns to the intersection $CR_1$ in the reverse direction, a display image $GD_3$ as shown in FIG. 14 is displayed. The display image $GD_3$ is obtained by turning the display image $GD_1$ shown in FIG. 11 by 180°. If the user requests for the diverging direction sign data by means of the input unit 15 in the state where the position mark $P_2$ is in an area depicted by a broken line, a display image $GD_4$ shown in FIG. 15 is displayed in place of the display image $GD_3$. It will be noted that the display image $GD_4$ is obtained by turning the display image $GD_3$ shown in FIG. 14 by 180°.

The present invention is not limited to the specifically described first and second embodiments thereof. A self-sustaining type position measurement device can be used in lieu of the GPS receiver 11. The storage medium for storing map data is not limited to the CD-ROM disc C1. For example, it is possible to use an optical disc, an optomagnetic disc, or a magnetic storage device. Further, the storage media are not limited to read only storage media but writable storage media can be used. For example, map data is recorded on such a writable storage medium by the user as needed. It is also possible to employ, in lieu of the ID card C2, another storage medium of the read only type or readable and writable type. It is also possible to form the storage unit and the map information storage unit with identical storage media. The information indicating unit 105 is not limited to the CRT unit. For example, a liquid crystal display can be used.

Further, the information indicating unit 105 the includes a speech indicating unit, such as aforementioned speech synthesizing device 17 in FIG. 2. For example, the speech synthesizing device 17 used in the first embodiment of the present invention generates voice information indicating "There is a Higashimatsuyama station at a distance of 5 km on the right-hand side in the heading direction". For example, the speech synthesizing device 17 used in the second embodiment of the present invention generates voice information indicating "You will be heading toward Higashimatuyama if you go straight after the next intersection; Ohmiya if you turn right; and Kawagoe if you turn left. The voice information is converted into voice by the speaker 18 in FIG. 2.

It is possible to modify the second embodiment of the present invention so that the heading area sign related to an intersection is automatically displayed under the control of the microcomputer 11 when the movable body enters the area in which the above intersection is located. In FIG. 11, it is also possible to the heading area sign related to the intersection $CR_1$ is continuously displayed as long as the movable body $P_1$ is located in the area indicated by the broken line.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation device comprising:
    position measurement means for measuring a current position of a movable body and generating current position information indicating the current position of the movable body;
    map information storing means for storing map information;
    additional information storing means for storing additional information which can be indicated together with the map information, said additional information comprising conspicuous object information;
    control means, coupled to said map information storing means and said additional information storing means, for selecting a current map area to be displayed, which includes the current position, and any neighboring conspicuous object, which is located in an area neighboring the selected current map area, and generating indication information including the current position of the movable body, the map information of the selected current map area, and the conspicuous object information of the selected neighboring conspicuous object, which is superimposed on the map information at its peripheral portion on the side of said neighboring area, wherein said control means comprises means for generating information concerning azimuths of the conspicuous objects and at least one of the names of the conspicuous objects and distances between the current position and the conspicuous objects; and indicating means, coupled to said control means, for externally indicating said indication information.

2. A navigation device as claimed in claim 1, wherein:

the additional information comprises a plurality of information categories; and the navigation device further comprises input means for specifying at least one of the categories; and said control means comprises means for reading, from said additional information storing means, the additional information related to said at least one of the categories specified by said input means.

3. A navigation device as claimed in claim 1, wherein:

said map information is related to a plurality of areas; and said control means comprises first means for reading, from said map information storing means, the map information concerning one of the areas in which the movable body is located, and second means for reading, from said additional information storing means, the additional information concerning said one of the areas and said neighboring area, which neighbors said one of the areas.

4. A navigation device as claimed in claim 1, wherein said position measurement means comprises a GPS (Global Positioning System) receiver which receives GPS position information from a satellite and which generates the current position information of the movable body from said GPS position information.

5. A navigation device as claimed in claim 1, wherein said indicating means comprises a display unit.

6. A navigation device as claimed in claim 1, wherein said indicating means comprises a voice synthesizing unit.

7. A navigation device as claimed in claim 1, wherein said control means generates the indication information including graphic data forming a display image of an arrow, which indicates a direction of an azimuth of the selected neighboring conspicuous object with respect to the current position, and which is superimposed on the map information beside said conspicuous object information of the selected neighboring conspicuous object.

* * * * *